March 28, 1967 G. F. QUITTNER 3,311,818
NON-CONTACT APPARATUS FOR MAGNETICALLY MEASURING STRAIN
Filed March 11, 1963 2 Sheets-Sheet 1
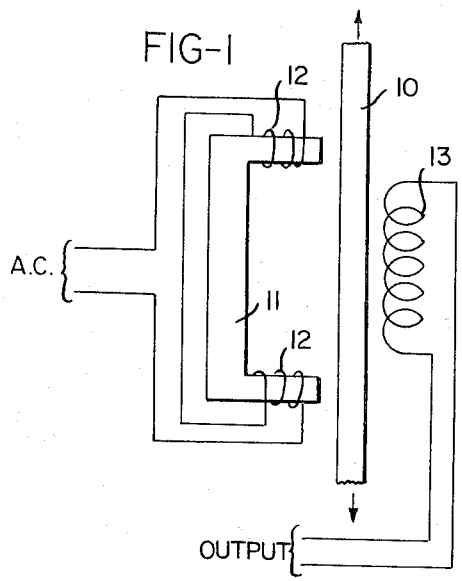
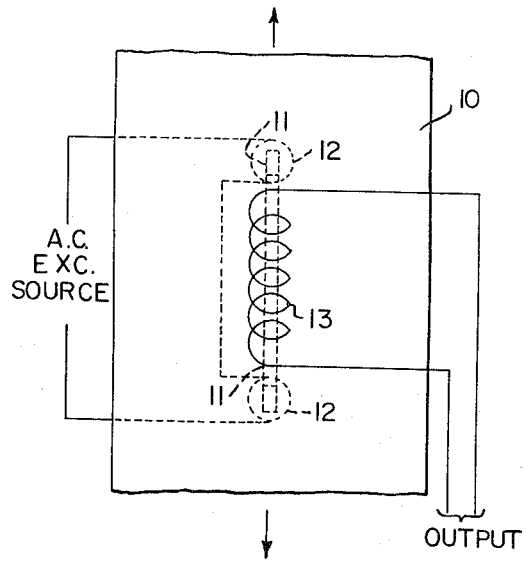
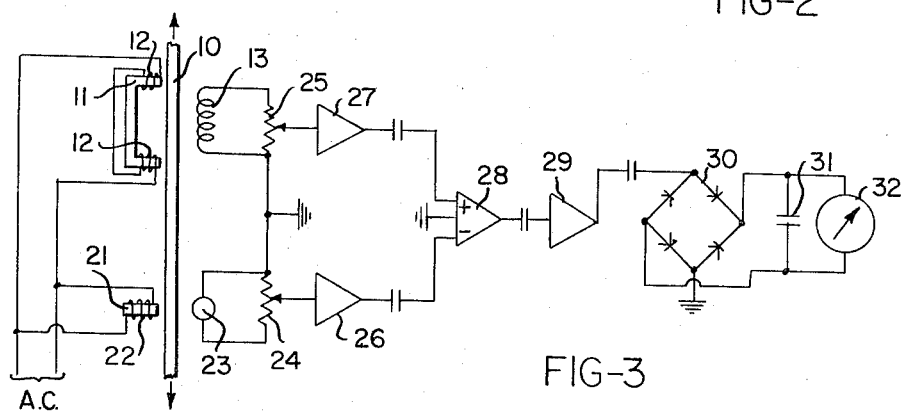
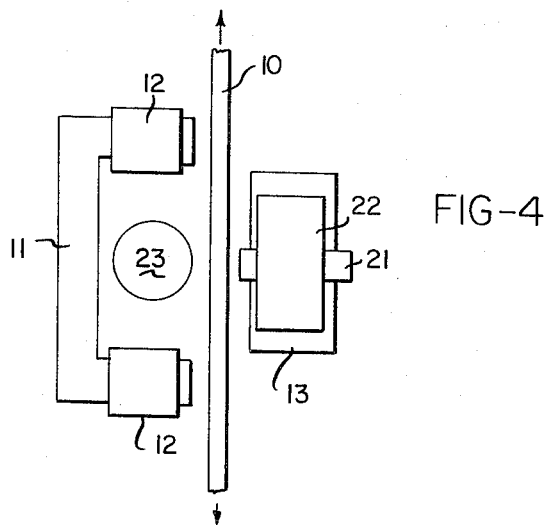
INVENTOR.
GEORGE F. QUITTNER
BY Richard MacCutcheon
ATTORNEY March 28, 1967  G. F. QUITTNER  3,311,818
NON-CONTACT APPARATUS FOR MAGNETICALLY MEASURING STRAIN
Filed March 11, 1963  2 Sheets-Sheet 2
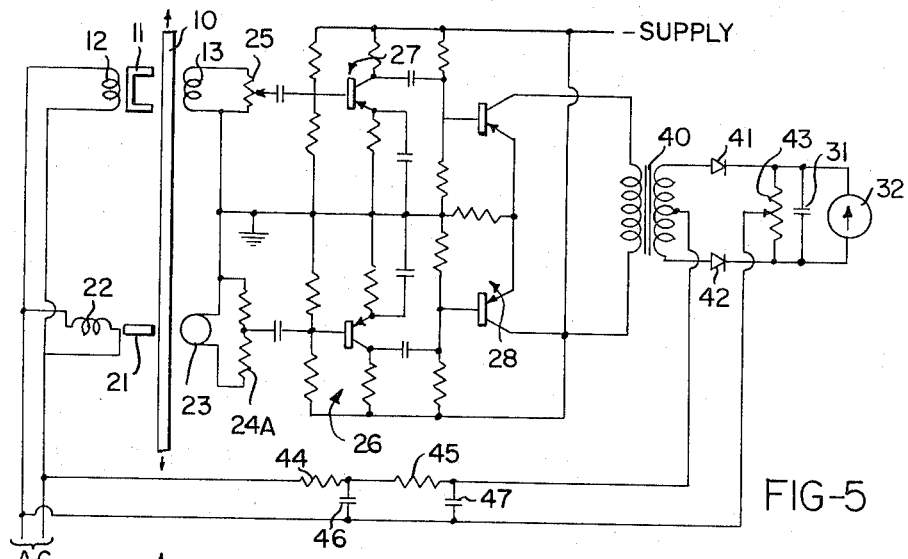
FIG-5
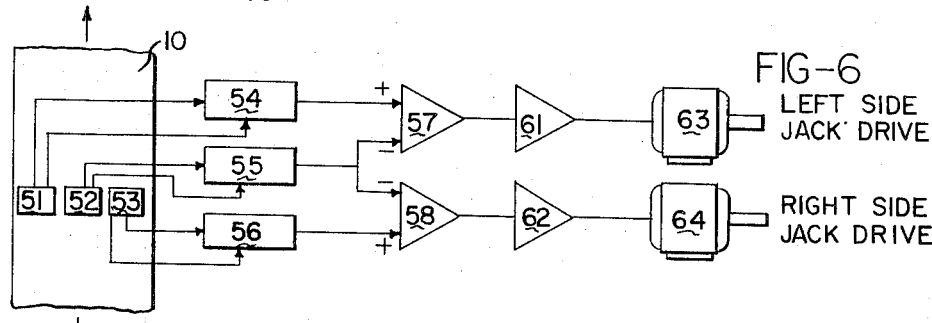
FIG-6
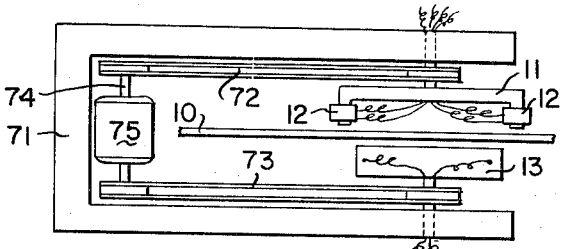
FIG-7
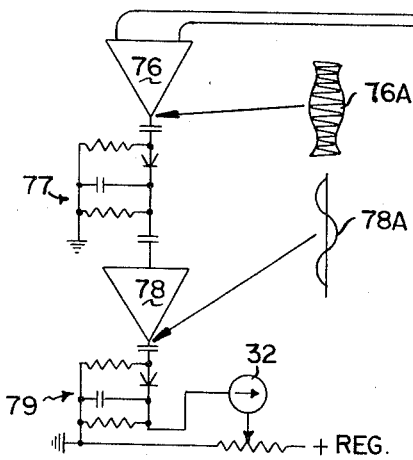
INVENTOR.
GEORGE F. QUITTNER
BY
ATTORNEY

United States Patent Office 3,311,818
Patented Mar. 28, 1967

3,311,818
**NON-CONTACT APPARATUS FOR MAG-
NETICALLY MEASURING STRAIN**
George F. Quittner, Cleveland Heights, Ohio, assignor,
by mesne assignments, to API Instruments Company,
Chesterland, Ohio, a corporation of Ohio
Filed Mar. 11, 1963, Ser. No. 264,096
3 Claims. (Cl. 324—34)

In the processing of ferrous metal sheets by cold rolling, tempering (a relatively slight reduction by cold rolling), annealing in continuous anneal furnaces, and the like, the control of tension is an extremely important factor, not only in obtaining a uniform product having desired physical properties, but also for preventing mishaps which cause scrap as well as lost production time.

While many methods of tension control are possible for moving strips, heretofore the most practical and widely used method is the measurement of current to the drive motors. This method, while useful, shares with other available methods a number of serious disadvantages. For example, its accuracy and resolution is dependent upon the amount of friction in the drive system, which is not a constant or easily controllable factor. Further, since the rotating equipment is very massive, the total moment of inertia is likely to be very great, leading to serious problems in closed loop control systems. In addition, the strain, as measured in this way, necessarily is overall strain on the entire sheet width, whereas a method capable of measuring local strain (as a bonded strain gage can for stationary test pieces) would be far more informative. Other methods have similar or more serious disadvantages rendering them less useful than this.

A method of great utility for materials more flexible than steel involves the use of a "dancer roll" whose position is signaled by a suitable position signaling transducer, but for steel this technique is unsuitable because of the stiffness of the sheet, the undesirability of adding additional surface contacting rolls to a production line, and the slow response and inertia of a dancer roll system.

It is an object of my invention to overcome these disadvantages in an economical, simple manner.

Further objects and advantages will be evident from consideration of the following description and appended drawings.

In the drawings:

FIG. 1 is a side view, and FIG. 2 a bottom view, schematically illustrating certain principles employed according to the present invention;

FIG. 3 schematically shows a preferred embodiment;

FIG. 4 shows a modification of the sensing arrangement;

FIG. 5 schematically shows another embodiment;

FIG. 6 shows apparatus using a plurality of devices according to the invention to achieve a useful new type of control system, and FIG. 7 shows a modification.

In FIG. 1 a strip sample 10 assumed of ferromagnetic material is shown in edge view, arrows at its ends indicating that it is under strain due to forces applied in the directions of the arrows. It also may be in motion, relative to the other parts in the drawing, usually in one of the directions indicated by the arrows. On one side of sample 10 a preferably laminated exciter coil core 11, of generally C shape, is positioned so that its open ends are adjacent to sample 10 but not in contact with it.

Coils 12, supplied with alternating current excitation, magnetically energize core 11. C core 11 is positioned so that a line joining its open ends would be parallel to a line in the direction of strain in sample 10. A coil 13 is positioned on the other side of sample 10 from core 11. Its axis is oriented parallel to the direction of strain in sample 10. Coil 13 is approximately centered with respect to the open ends of excitation core 11. FIG. 2 is orthogonally related to FIG. 1, has like parts like numbered, and is included to more fully show the geometric relations described above. Leads from sensing coil 13 provide output signals to voltage responsive readout equipment (not illustrated in FIGS. 1 and 2).

Although it is fairly well known that the permeability of a ferromagnetic material is altered when it is subjected to strain, I have discovered that when sample, excitation field and pickup coil are arranged as in FIG. 1, the voltage generated in coil 13 is significantly, and in a generally proportioned manner, altered by variations in strain in the sample in the direction indicated. By comparison, strain in the plane of the sample major dimensions, exerted in a direction 90° opposed to the first direction produces little change in reading. Compressive strain generally tends to decrease the voltage reading while tensional strain tends to increase the reading. Perhaps this occurs because under compressive strain permeability is increased, whereupon a larger fraction of the exciter core field flux is contained within the sample, leaving less "overflow" to be picked up by sensing coil 13. It appears that the directional character arises because the magnetic path within the sample is relatively much larger in the direction of high strain than in a 90° different direction.

It will be observed that the position of coil 13 with respect to sample 10 is such that the sample acts as a quite effective magnetic shield (shunt). To obtain adequate signal, relatively great excitation is desirable, and the plural exciter coils 12 on laminated core 11 aid greatly in attaining sufficient flux in the sample, despite the necessary air gaps in the magnetic circuit. Signal could be increased by use of a ferrous core in pickup coil 13, but I prefer not to do this because a degree of erratic magnetization is usually present in steel strip in the mill, and the presence of a core in coil 13 would tend to exaggerate the "noise" from the passing of these magnetized regions. In my experimental apparatus I used approximately 50 watts of exciter power at 16 ohms impedance with 100 turns of #14 wire in each of the series connected exciter coils 12. Core 11 to sample 10 space was ¼". Pickup coil 13 contained 100,000 turns, was ¼" from sample 10 at the closest point, and developed about 100 mv. R.M.S. (when using 1 kc. exciter freq.). The sample 10 was .008" thick tinplate. Change in the 100 mv. signal for reasonable strains was approximately ±10%.

In practically applying my discovery certain difficulties arise, largely because metal material does not exhibit constant permeability or resistance. Typically not only will one coil of steel strip (originating from a single ingot) vary from the next, but variations will occur from place to place within a coil of strip. Therefore, in attempting to read strain, the arrangement of FIG. 1 (and 2) alone leads to readings which vary not only because of strain variations but also because of steel variations.

According to a preferred embodiment of my invention I overcome this basic difficulty by comparing the signal in the strained direction with a similarly derived signal measured in the relatively unstrained direction, i.e., at right angles to the first, and deriving my strain reading as the difference (or in other embodiments, the ratio) between these voltages. In this way, when the permeability of the strip, for example, rises, both signals become proportionally smaller, but because the strip permeability change is a small fraction of the total possible span of permeability values, the percentage change in the difference between the two signals is small. Further, since at any time desired the two signals can be balanced to yield a very small residual difference (and can, in fact be balanced to zero, if the signals are rectified and filtered to D.C. before comparison), a very sensitive device can be made. Since permeability varies not only with the composition and cold-work history of the material, but also with the temperature of the material, the comparison technique similarly greatly decreases the effects of past history and present temperature on the readings. The difference signal is useful because in strip handling, applied tension, hence strain, is applied in only one dimension.

In FIGS. 3 sample 10, core 11, energizing coils 12 and sensing coil 13 are as described in FIGS. 1 and 2. An added core 21, energizing coils 22, and sensing coil 23 are arranged with respect to one another exactly as are coil 11, coils 12 and coil 13, but they are arranged at 90° to the orientation of 11, 12 and 13. Input level and balancing potentiometers 24 and 25 serve like purposes. Amplifiers 26 and 27 amplify the two signals. Differential amplifier 28 accepts the two amplified signals and delivers an A.C. voltage proportional to the difference between the output voltages of amplifiers 26 and 27. An additional amplifier 29 may be used to increase the power available for readout. The readout equipment selected for discussion utilizes a full wave rectifier bridge 30, a smoothing capacitor 31, and an indicating meter 32. In applications requiring automatic tension control, a typical suitable final element might be a double limit contact meter relay operating an alarm or correction apparatus, or might be a magnetic amplifier provided so that the output causes increased product tension when tension falls to a value near the selected control level, and decreased tension when the opposite effect occurs.

In practical industrial conditions there is always a significant amount of random sheet motion which produces irrelevant signals ("noise") in the strain readout equipment such as meter 32. Much of this can be removed by (1) use of narrow band amplifiers tuned to excitation frequency (also with the advantage of reducing the value of the "null" obtained when the two channels are correctly balanced to represent the "zero" or an arbitrarily selected strain condition), and (2) by judicious selection of capacitor 31. The value of capacitor 31, like the frequency selected for the excitation source, affects the response rate. Because this transducer system includes no mechanical parts whose moment of inertia limits response, by comparison with existing methods of strain signaling the system is capable of very high response rates.

FIG. 3 shows both excitation sources on the same side of sample 10, and this arrangement may be advantageous under some circumstances because if the pass line of the strip, for example, moves closer to the excitation coils, both signals become proportionally larger, so that noise from this kind of motion does not appear at the readout device (for near null conditions). For other conditions an arrangement as in FIG. 4 may be advantageous because of (1) its compactness, and (2) the fact that the bidirectional comparison is actually made simultaneously on the same area of material.

In FIG. 4 exciter coils 12 on their core 11 are arranged on one side of the sheet 10 with the corresponding sensing coil 13 on the opposite side, just as in FIGS. 1 and 2. In FIG. 4, however, exciter coils 22 on their core 21 are arranged on the opposite side of the sheet 10 from coils 12 and core 11, with sensing coil 13 nestled between the legs of core 21. Sensing coil 23 is similarly positioned between the open legs of core 11. By accurately positioning sensing coil 13 with respect to core 21 (and similarly by suitably positioning sensing coil 23 with respect to the legs of core 11) essentially no voltage will be generated in coils 13 and 23 by the flux due to core 21 or 11, respectively. For clarity, no connection leads are shown in FIG. 4 and no physical supporting structure is shown in any of the drawing figures.

In many applications the desired usage for the non-contact strain gage is not to provide absolute strain readings, but to provide automatic control action or merely readable deviations from an empirically determined but desirable operating condition. A very sensitive yet stable system is shown in FIG. 5. The excitation and sensing arrangements are exactly as previously described for FIG. 3, although physically the arrangement could have been like that of FIG. 4. One input potentiometer (24 in FIG. 3) has been changed to a fixed voltage divider 24A. Amplifiers 26 and 27 are as in FIG. 3, as is differential amplifier 28. But in FIG. 5 differential amplifier 28 terminates in a transformer 40 having a center tapped secondary. The end leads from this winding are connected through oppositely connected (with respect to current flow through the entire winding) rectifiers 41 and 42, whose load is a potentiometer 43. Voltage at excitation source reference phase is passed through a phase shifting network comprising resistors 44 and 45 and capacitors 46 and 47. The correctly phased voltage is fed between the center tap of transformer 40 and the adjustable tap of potentiometer 43. Smoothing capacitor 31 and readout device (such as meter 32) are connected across potentiometer 43.

In operation, the position of the adjustable tap in potentiometer 43 is selected to produce zero reading at meter 32 where (a) potentiometer 25 has been adjusted to produce minimum current in the primary of transformer 40 for a selected strain condition in the sample 10, and (b) the values of resistors 44 and 45 and capacitors 46 and 47 in the phase shift network have been selected to produce approximately 90° phase lag in the voltage applied to the phase detector (comprising the secondary of transformer 40, the rectifiers 41 and 42, and the potentiometer 43). Under these conditions the voltage at meter 32 will be zero at the selected strain condition and will become greatly positive or negative with very slight strain condition changes in one or the other direction.

In a steel strip processing mill or plant, control of strip "shape" is very important. Poor "shape" results from the naturally occurring condition that if a strip is equally pulled across its entire width, the strain near the edges is necessarily greater than in the center of the strip. This as well as other contributing conditions results in "crown," and even "edge wave," due to the edges of the strip actually having "greater length" than the center. Methods of control of this problem are available, but their usefulness is fundamentally limited by the inability to provide automatic control action; a processing change cannot be instituted until the operator has observed and assessed the degree of correction required by observing already defective production. By using three non-contact strain gages, located one at each side and one at strip center, according to one aspect of the present invention, an entirely new order of knowledge about and control of processing conditions is possible, leading to significantly improved strip quality. Although many other schemes are possible, of course, the embodiment selected for illustration in FIG. 6 utilizes a technique currently (i.e., at time of filing) gaining acceptance in the steel industry; without manual control and without having to base corrective action on visual observations.

In FIG. 6, sensors 51, 52 and 53 are three energizing-sensing transducers made according to my invention, each, for example, scanning strain and transverse directions (preferably as shown in FIG. 4) and arranged to scan, respectively, the left side, center, and right side of sample 10 as it leaves a cold reduction mill or temper mill. Blocks 54, 55 and 56 represent the respective read-out equipments (presumably each having a difference detector) for the transducers, and may each be as illustrated in FIG. 3 or FIG. 5, for example. Difference amplifiers 57 and 58 respectively compare the tension at the left side with that at the center, and at the right side with that at the center, producing in each case an output signal whose amplitude is proportional to the difference between input signals and whose sign indicates which input is greater. Power amplifiers 61 and 62 increase the respective difference signals to levels suitable for operation of reversible jack motors 63 and 64, which may, for example, operate against the respective roll bearings on a roll stand (not shown). Amplifiers 57, 58, 61 and 62 may very conveniently be of the magnetic amplifier type.

In operation, when, for example, the left side begins to thin slightly thus become elongated as compared with the center, its strain decreases rapidly as compared with the center, long before there is sufficient error to be visible in the strip, and this comparison information is signaled by amplifiers 57 and 61. Consequently motor 63 rotates enough to jack apart the left ends of the work rolls which slightly increases left side thickness at the expense of center thickness. As the condition is alleviated, motor 63 stops running until some additional correction is required. In practice, of course, certain additional constraints (for example, limit switches, average thickness signal feedback to roll screw-downs, etc.) may be required, but these have been omitted from this disclosure for clarity.

The discovery of the directional characteristics of the arrangements already discussed may be exploited by comparison means other than those hereinbefore described. FIG. 7 illustrates a comparison method advantageously applicable to certain conditions. A core 11 carries exciter coils 12, and it and sensing coil 13 are held in constant relation to sample 10, but in FIG. 7 are supported rotatably about an axis perpendicular to the plane of sample 10 by a stationary yoke 71. The two pieces (11 and 13) are rotated simultaneously and in exact phase synchronism by toothed belts 72 and 73 driven through a common shaft 74 driven by a motor 75. Slip ring assemblies (not shown) permit A.C. energization of coils 12 from a stationary source. Similar arrangements permit single connections from coil 13 to an amplifier 76, which may advantageously have a narrow frequency pass band centering at the frequency of the A.C. excitation source. The amplified signal may be "envelope detected" by conventional means 77 selecting an integration time constant for passing signals at twice the r.p.s. of the rotating sensory equipment but filtering out excitation source frequency. A further amplifier 78 may advantageously be of the narrow band pass type whose center frequeniy is twice the r.p.s. of the sensory equipment. The energy in this signal is detected by a second integrator 79 having a relatively large RC time constant for removing from the output signal the low frequency modulation signal. The thus derived output is then read on meter 32, preferably provided with a zero suppression adjustable voltage return circuit as shown in FIG. 7.

In operation, as core 11 and its exciter coils 12 rotate in synchronism with sensing coil 13, when the assembly is lined up with the direction of minimum permeability (maximum strain) in sample 10 the amplitude of the signal from coil 13 will beat a maximum. A minimum occurs, similarly, when the assembly rotates past the direction of minimum strain. The amplified signal from amplifier 76 is shown in FIG. 7 as 76A, in which two maxima and two minima occur for each complete sensing assembly revolution. The detected envelope, amplified, is shown at 78A. The energy in this signal is the *difference* between the permeabilities in the maximum and minimum directions of sample 10. Because the process of preparing ferrous strips leads to differences in permeability with orientation, there is always a "zero" signal of some magnitude, even when the sheet is not under stress. The "zero" signal may conveniently be suppressed by selecting the voltage level to which the meter 32 returns, as illustrated.

It is notable that the system and method of my invention is more correctly termed a "strain" sensing device than a "tension" measuring device. This is because if, for a given number of lbs. of tension applied to the metal, the thickness of metal is increased, the readings will decrease, due to increased "permeance" of the magnetic path, in approximately the same way the strain goes down because the constant lbs. tension is applied to a larger area cross-section. Similarly, a wider sheet, for constant tension, will produce lower readings according to my invention, by lowering the lbs./sq. in. strain.

There is thus provided apparatus of the class described capable of meeting the various objects above set forth. While particular embodiments have been illustrated and described, various modifications may obviously be made without departing from the true spirit and scope of the invention which is intended to be defined only by the appended claims taken with all reasonable equivalents. While I prefer "through-the-sheet" pickup (as illustrated in all the drawings) this may not be an essential feature of the claims, unless prior art presently unknown to me requires them to be so limited, and, thus, there might be a flux producing coil supporting C yoke arranged on one side of sample with the C aligned at "plus" 45° to direction of probable strain, while the pickup coil is *on the same side* of sample but aligned at "minus" 45° with respect to direction of probable strain with the apparatus still being operative because changes in strain change the apparatus magnetic "shortest path," distorting the "air field" which the pickup coil looks at.

I claim:

1. Apparatus for non-contact ascertaining of substantially unidimension direction strain in a magnetic or eddy current conductive sample having two opposite sides, said apparatus comprising:

first means which includes a core and coil arrangement located adjacent a first of said sample sides and for electromagnetically linking with at least a portion of said sample and for producing a flux which extends therethrough substantially in a first direction, second means which includes a coil located adjacent the second of said sample sides and aligned in said first direction for electromagnetically sensing magnetic flux characteristic in said sample as caused by said first means, third means which includes a core and coil arrangement located adjacent one of said two sample sides and for electromagnetically linking with at least a portion of said sample and for producing a flux which extends therethrough in a second direction which is transverse to said first direction, fourth means which includes a coil located on the other of the two sample sides and aligned in said second direction for electromagnetically sensing magnetic flux characteristic in sample as caused by said third means, means for comparing the output of the second means with that of the fourth means, and means for reading out said comparison.

2. Apparatus as in claim 1 further characterized by the first means including a U core which spans the fourth means adjacent the first side of the sample and the third means including a U core which spans the second means adjacent the second side of the sample.

3. Apparatus as in claim 1 further characterized by the second means including a magnetic material core and the fourth means including a magnetic material core.

(References on following page)

References Cited by the Examiner

UNITED STATES PATENTS 2,370,845 3/1945 Davis _____ 324—34
2,557,393 6/1951 Rifenbergh _____ 324—34
3,156,862 11/1964 Herrick _____ 324—37

FOREIGN PATENTS 1,131,700 2/1957 France.

WALTER L. CARLSON, *Primary Examiner.*
R. J. CORCORAN, *Assistant Examiner.*